Jan. 22, 1963 P. S. HARDY 3,074,298
INDEXING ATTACHMENT FOR LAYOUT WORK ON LATHES
Filed Sept. 8, 1958
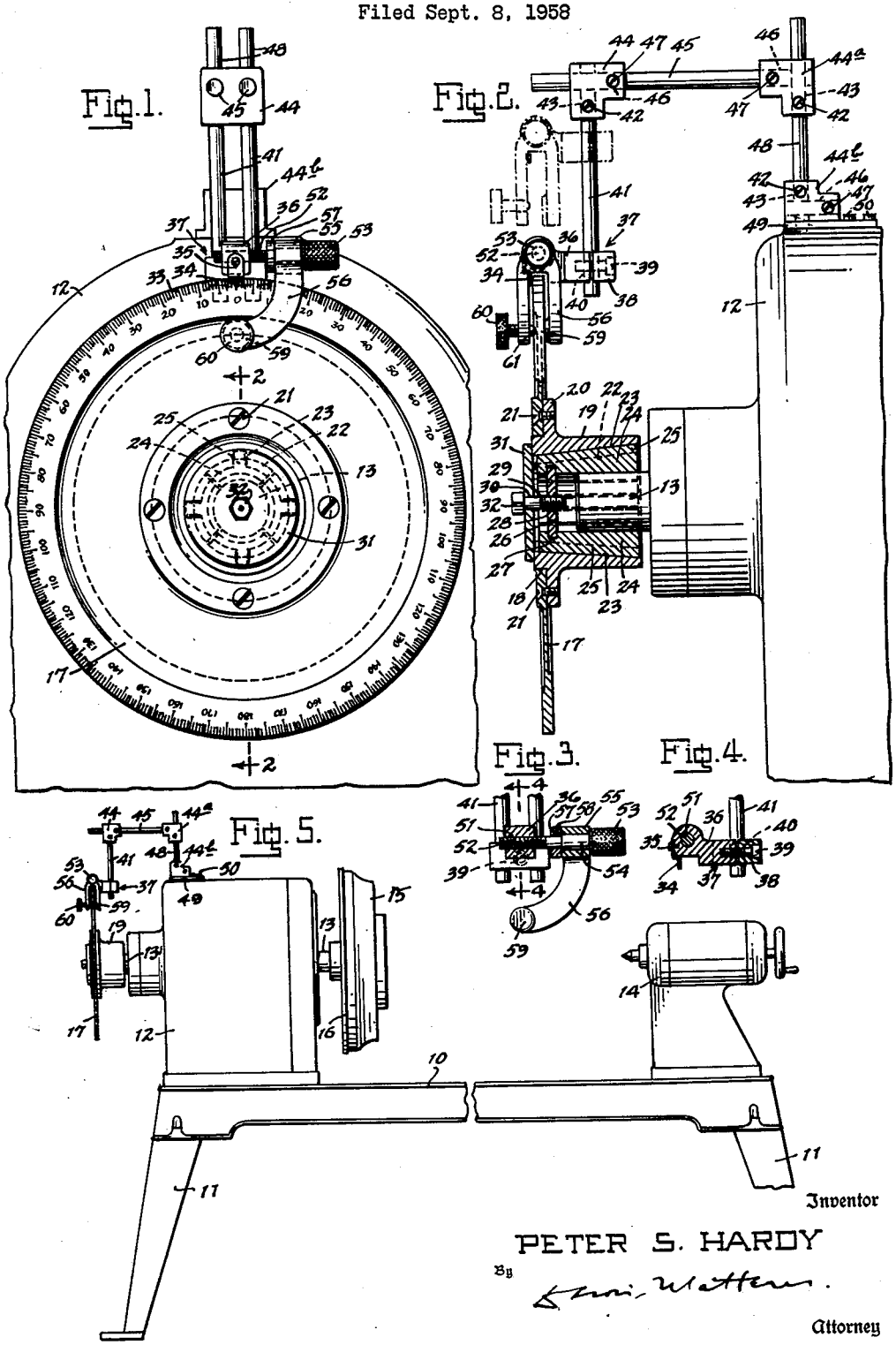
Inventor
PETER S. HARDY
Attorney

United States Patent Office 3,074,298
Patented Jan. 22, 1963

3,074,298
INDEXING ATTACHMENT FOR LAYOUT
WORK ON LATHES
Peter Semeon Hardy, Trumbull, Conn., assignor to Peerless Aluminum Foundry Co. Inc., Bridgeport, Conn., a corporation of Connecticut
Filed Sept. 8, 1958, Ser. No. 759,597
3 Claims. (Cl. 74—815)

The present invention relates to an indexing attachment for layout work on lathes, and is particularly adapted for the convenient and accurate laying out of wood patterns for use in metal founding. Such patterns are built up of wood and in certain cases require the accurate marking of the pattern at various angularly spaced points with respect to a center. The usual practise is to mount the wood pattern structure upon the face plate of the lathe, and thereupon by means of a protractor mark the various points desired in laying out the work. In the case of very large diameter pieces, it is very difficult to obtain accuracy in the marking, particularly at points widely spaced from the center.

An object of the invention is to provide an indexing attachment which may be secured upon the rearwardly projecting end of the headstock spindle of the lathe opposite the forward end upon which the work to be marked is mounted, and which may be turned with great accuracy to various angular positions to thus correspondingly turn the work piece to enable it to be accurately marked with respect to a given reference point.

It is particularly proposed to provide an indexing attachment including an indexing disc of relatively large circumference having a protractor scale adjacent its outer edge, whereby adjustments may be made with extreme accuracy with respect to a reference point in the form of a fixed index pointer.

A further object is to provide a locking means for fixing the position of angular adjustment of the disc, and which locking means is adjustably mounted with respect to the index pointer for micrometer adjustment, whereby the position of the disc may be adjusted from an approximate position to an exact position with respect to the index pointer through the operation of the micrometer adjustment means.

A further object is to provide an attachment wherein the disc member of the attachment may be readily mounted upon or removed from the lathe spindle, and wherein the index pointer and locking means may remain in place upon the lathe, thus enabling the normal operation of the lathe spindle without the encumberance of the index disc.

Other objects and advantages will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

In the drawings:

FIG. 1 is an elevational view of the attachment mounted upon the headstock of the lathe, as seen from the outer end of the lathe;

FIG. 2 is a side elevation, partially in vertical section, taken along the line 2—2 of FIG. 1, the dot-and-dash lines indicating an adjusted position of the index pointer and locking means to enable the indexing disc to be engaged with or disengaged from the lathe spindle;

FIG. 3 is a detail fragmentary vertical section of the locking means;

FIG. 4 is a vertical section taken along the line 4—4 of FIG. 3; and

FIG. 5 is a side elevation on a reduced scale showing the complete lathe provided with the indexing attachment.

Referring to the drawings, the lathe upon which the attachment of the invention is to be mounted, is of the conventional wood turning type comprising a bed 10 supported upon legs 11 and provided with the usual longitudinal ways (not shown), a headstock 12 provided with a spindle 13, and a tailstock 14. The work piece 15 is secured upon a face plate 16 mounted upon the inner projecting end of the spindle 13, and upon the outer projecting end of the spindle the indexing disc of the invention is mounted, so that rotation of the indexing disc imparts corresponding rotation to the work piece about a common axis.

The indexing attachment of the invention comprises a circular indexing disc 17 of relatively large diameter, for example, twelve inches, provided centrally with a circular opening 18 in which the forward end of a flanged hub 19 is engaged, the flange 20 of the hub being engaged upon the rearward side of the disc and secured thereto by screws 21. The opening 22 through the hub is of relatively convergent tapered form and is provided at equally spaced points, preferably four, with longitudinal grooves 23 disposed parallel to the tapered surface. Guided within these grooves are a plurality of segmental clamping jaw members 24 having their outer surfaces tapered to conform to the taper of the opening 22, and provided with longitudinal ribs 25 slidably engaged in the grooves 23. Relative rearward movement of the jaws causes them to move outwardly, while relative forward movement causes them to move inwardly into clamping relation with the spindle 13, their inner surfaces being cylindrical and of a diameter substantially conforming to the diameter of the spindle in the clamped position.

For the purpose of imparting longitudinal movement to the jaws a circular disc 26 has its peripheral margin slidably engaged in a circumferential groove 27 provided in the inner cylindrical surface of the jaws near their forward ends, a threaded hole 28 being provided centrally of the disc which is engaged by a screw 29 rotatably mounted in a central hole 30 of a clamping plate 31 bearing upon the forward end of the hub 19, the head 32 of the screw bearing upon the forward side of the clamping plate. By turning the screw in one direction to draw the disc 26 toward the clamping plate 31, the jaws 24 are drawn forwardly to cause them to move inwardly into clamping relation with the spindle, and by turning the screw in the opposite direction to move the disc away from the plate, the jaws are moved rearwardly to cause them to be released from the spindle.

The arrangement thus provides a clamping means which enables the indexing disc to be quickly engaged upon the spindle in tightly clamped accurately centered relation, without any change or alteration in the lathe spindle. The indexing disc is also easily removed, simply by turning of the screw 29 to release the clamping jaws, so that when a work piece has been marked and it is desired to operate the lathe in its normal manner, the indexing disc does not constitute an encumbrance, nor is it subjected to the wear or deterioration that might result should it remain in place upon the spindle during operation of the lathe.

Upon the outer side of the disc, adjacent its outer periphery, there is provided a protractor scale 33 illustrated in the form of a full circle scale having 360 degree markings. In practise it will be understood that the scale may be provided with further fractional degree markings.

The index pointer 34, which in its operative position is disposed in fixed relation in front of the protractor scale of the indexing disc, is secured by a screw 35 upon the forward end of the forward part 36 of a split clamping block 37, the rearward part 38 of which is connected to the forward part by a tightening screw 39. At each side of the screw 39 there are provided a pair of vertical passages 40—40 formed by semi-cylindrical grooves in the forward and rearward parts of the split block, in which are engaged a pair of vertically disposed rods 41—41, the upper ends of which are secured by set screws 42 in passages 43 provided in a right angle elbow connector 44. The elbow connector is supported for horizontal adjustment upon a pair of horizontal rods 45 engaged in passages 46 at right angles to the passages 43 and secured by set screws 47. The rearward ends of the rods 45 are engaged and secured in the horizontal passages of a second elbow connector 44a of identical form to the connector 44, and within the vertical passages 43 of which there are engaged and secured a pair of vertical rods 48—48 upon which the connector 44a may be vertically adjusted. The lower ends of the rods 48 are engaged and secured in the vertical passages 43 of a connector 44b of corresponding form to the connectors 44 and 44a, but provided with an attaching base 43 secured upon the upper side of the headstock 12 by screws 50.

With this arrangement the index pointed may be disposed through adjustment or rearrangement to the rods and connectors so as to position it with respect to the protractor scale of the indexing disc 17, and the structure further permits of attachment to any suitable place upon the headstock. Also, by loosening the screw 39 the split block 37 may be elevated upon the rods 41 to a position where the index pointer and associated parts carried by the block are clear of the indexing disc while the latter is being engaged with or disengaged from the spindle 13.

The forward part 36 of the split block 37 is provided with a threaded hole 51 in which a micrometer screw 52 is engaged, this screw having its axis in outwardly spaced tangential relation to the periphery of the indexing disc 17. The micrometer screw is provided at its outer end with a manipulating knob 53 and adjacent the knob the stem of the screw is provided with a cylindrical bearing portion 54 upon which the hub 55 of a locking member 56 is engaged, a collar 57 being secured upon the stem of the screw by a set screw 58 to fix the hub 55 against axial movement relative to the micrometer screw while permitting the screw to be freely turned within the hub by manipulation of the knob 53. Thus through turning of the micrometer screw the locking member is moved relatively to the index pointer in a direction tangential to the periphery of the indexing disc.

The locking member is in the form of a yoke having arcuate side legs which extend downwardly at each side of the indexing disc and curve so that their lower opposed ends are substantially radially aligned with the index pointer 34. The readward leg is provided with a circular pad formation 59 adapted to bear against the rearward surface of the indexing disc and the forward leg is provided with a thumb screw 60 having a rounded bearing end 61 which is adapted to bear upon the forward side of the indexing disc in substantially centered relation to the pad 59, so that when the thumb screw is tightened the indexing disc is clamped between the pad and the thumb screw and is thus locked against movement.

In the operation of the indexing attachment of the invention, the work piece 15 to be laid out is secured upon the face plate 16 and the indexing disc is rotated to a position where the index pointer is at the zero degree marking. The manual rotation of the disc will bring it to an approximate zero posititon. In order to exactly position it the thumb screw 60 is tightened to lock the indexing disc, and thereupon through turning the micrometer screw 32 by means of the knurled knob 53 the locking yoke member 56 will be moved in the axial direction of the screw, and in turn will rotate the indexing disc locked thereto.

The combined lineal movement of the micrometer screw carrying the locking yoke member and the rotary movement of the indexing disc is made possible by the fact that the point at which the thumb screw 60 and the pad 59 lockingly clamp the disc is along a circumference line near the outer periphery of the disc of relatively large radius, so that the relatively tangential axis of the micrometer screw is substantially parallel to the circumferential line, for the relatively small distance through which the micrometer adjustment of the indexing disc is normally made, i.e., the circumferential line for the short distance at each side of the point of tangency is for all practical purposes a straight line in parallel relation to the axis of the micrometer screw.

When the exact zero position has been set a reference marking is placed upon the work piece. Other angular positions of the work piece can then be marked by first releasing the thumb screw 60 to allow the indexing disc to be turned, and thereupon turning it to bring the desired degree marking of the protractor scale to the approximate registered position with the index pointer. At this point and before marking the work piece, the thumb screw is tightened to lock the indexing disc, and thereupon the micrometer screw is turned to bring the scale marking of the disc into exact register with the index pointer. Further markings at any desired angle are carried out by repeating this operation.

As shown by the dot-and-dash lines in FIG. 2, the index pointed and the locking yoke member may be elevated upon the rods 41 by first loosening the clamping screw 39, so that these parts are clear of the indexing disc to permit it to be readily disengaged from or engaged with the spindle 13.

What is claimed is:

1. An indexing attachment for latches having a headstock and a spindle rotatably mounted in said headstock, including an inner spindle end at one side of said headstock upon which a work-piece is adapted to be mounted and an outer spindle end at the opposite side of said headstock, said attachment comprising a circular indexing member having a protractor scale in proximity to its outer periphery, means carried by said indexing member for removably securing it in co-axial relation to said outer spindle end, an index pointer for cooperation with said protractor scale, a mounting support for said pointer normally fixed with respect to said headstock and having a micrometer screw receiving threaded hole, a clamping yoke having a hub portion disposed outwardly of the outer periphery of said indexing member and a pair of leg portions normally disposed at opposite sides of said indexing member, a clamping screw carried by one leg portion adapted to releasably clamp said indexing member between said leg portions along a circumferential line thereof in proximity to its outer periphery for releasably locking said indexing member in any angular relation thereof to establish an approximate setting, a micrometer screw engaged in said threaded hole of said mounting support and rotatably engaged with said hub portion of said clamping yoke for imparting adjustment movement to said clamping yoke to move said indexing member to an exact setting relative to said approximate setting, and means restraining relative axial movement between said hub portion and said micrometer screw.

2. The invention as defined in claim 1, further characterized by mounting means adjustably supporting said micrometer screw and clamping yoke for relative movement to a position clear of said indexing member to permit axial movement of the latter into and out of engagement with said spindle.

3. An indexing attachment for accurately indexing a shaft relative to a support comprising a base, a circular indexing member having a protractor scale in proximity to its outer periphery, means carried by said indexing member for removably securing it in co-axial relation to said shaft, a normally fixed block member, an index pointed fixed to said block member for cooperation with said protractor scale, mounting means adjustably supporting said block member for relative adjustment with respect to said base and said indexing member, locking means for releasably locking to said indexing member in any angular relation thereof at an approximate setting of said protractor scale with respect to said index pointer, and means connected to said locking means and adjustable relatively to said block member for imparting adjustment movement to said locking means relatively to said block member to move said indexing member when locked to said locking means to an exact setting of said protractor scale relative to said approximate setting.

References Cited in the file of this patent
UNITED STATES PATENTS

| | | |
|---|---|---|
| 774,515 | Geier | Nov. 8, 1904 |
| 855,499 | Burkhead | June 4, 1907 |
| 1,191,073 | Hammond | July 11, 1916 |
| 1,944,897 | Macneil | Jan. 30, 1934 |
| 2,123,811 | Sinko | July 12, 1938 |
| 2,411,870 | Chauvet | Dec. 3, 1946 |
| 2,437,807 | Dowell et al. | Mar. 16, 1948 |
| 2,588,932 | Klingenberg | Mar. 11, 1952 |
| 2,664,641 | Parnet | Jan. 5, 1954 |
| 2,972,260 | Nilges | Feb. 21, 1961 |